(12) United States Patent
Morikawa et al.

(10) Patent No.: US 7,370,972 B2
(45) Date of Patent: May 13, 2008

(54) TWO-DIMENSIONAL IMAGE DISPLAY DEVICE

(75) Inventors: Akihiro Morikawa, Osaka (JP);
Ken'ichi Kasazumi, Osaka (JP);
Kiminori Mizuuchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 51 days.

(21) Appl. No.: 10/584,247

(22) PCT Filed: Dec. 24, 2004

(86) PCT No.: PCT/JP2004/019324

§ 371 (c)(1),
(2), (4) Date: Jun. 23, 2006

(87) PCT Pub. No.: WO2005/062114

PCT Pub. Date: Jul. 7, 2005

(65) Prior Publication Data

US 2007/0153235 A1 Jul. 5, 2007

(30) Foreign Application Priority Data

Dec. 24, 2003 (JP) ............................. 2003-426798

(51) Int. Cl.
*G03B 21/14* (2006.01)
*G03B 21/00* (2006.01)
*G03B 21/22* (2006.01)
*H04N 3/02* (2006.01)
*H04N 3/28* (2006.01)
*H04N 9/04* (2006.01)
*H04N 9/07* (2006.01)

(52) U.S. Cl. ............................. 353/20; 353/31; 353/75; 353/84; 353/97; 348/201; 348/206; 348/210.99; 348/266

(58) Field of Classification Search .................. 353/20, 353/30–31, 75, 84, 97; 348/195, 201, 206, 348/210.99, 266
See application file for complete search history.

(56) References Cited

U.S. PATENT DOCUMENTS

| | | | |
|---|---|---|---|
| 5,313,479 A | 5/1994 | Florence | 372/26 |
| 6,183,092 B1 * | 2/2001 | Troyer | 353/31 |
| 6,577,429 B1 | 6/2003 | Kurtz et al. | 359/279 |

(Continued)

FOREIGN PATENT DOCUMENTS

JP  55-65940  5/1980

(Continued)

*Primary Examiner*—Diane I. Lee
*Assistant Examiner*—Magda Cruz
(74) *Attorney, Agent, or Firm*—Steptoe & Johnson LLP

(57) ABSTRACT

In a two-dimensional image display device, speckle noise is reduced by a simple construction. A two-dimensional image display device for displaying an image by projecting coherent light onto a projection plane is provided with at least one coherent light source (1a), (1b), (1c) for outputting coherent light, a polarization state modulator 6 for modulating at least one of a polarization state and a phase of the coherent light emitted from the coherent light source, and a birefringent diffusion plate (7) for spatially varying the phase of the coherent light emitted from the polarization state modulator. The polarization states of light spots in the respective pixels of the image displayed on the projection plane are spatially and temporally varied, thereby forming various speckle patterns.

16 Claims, 10 Drawing Sheets

U.S. PATENT DOCUMENTS 6,751,009 B2 *   6/2004   Khoshnevisan et al. .... 359/305
6,945,652 B2 *   9/2005   Sakata et al. ................. 353/30
7,271,962 B2 *   9/2007   Kasazumi et al. .......... 359/707

FOREIGN PATENT DOCUMENTS

| | | |
|---|---|---|
| JP | 3-109591 | 5/1991 |
| JP | 6-208089 | 7/1994 |
| JP | 7-151995 | 6/1995 |
| JP | 2003-121791 | 4/2003 |
| JP | 2003-279889 | 10/2003 |

* cited by examiner

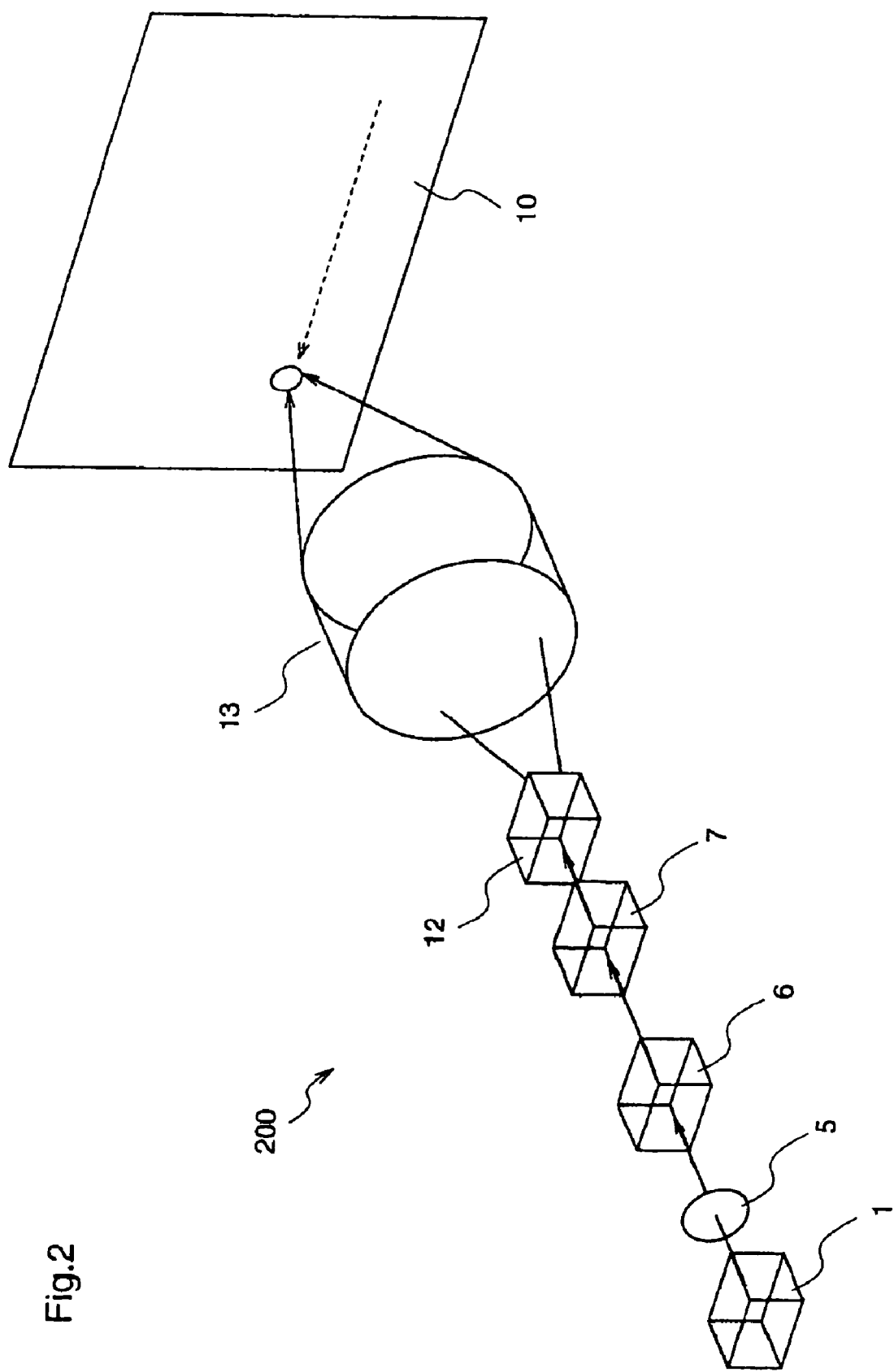

TWO-DIMENSIONAL IMAGE DISPLAY DEVICE

CLAIM OF PRIORITY

This application claims priority under 35 USC 371 to International Application No. PCT/JP2004/019324, filed on Dec. 24, 2004, which claims priority to Japanese Patent Application No. 2003-426798, filed on Dec. 24, 2003, each of which is incorporated by reference in its entirety.

TECHNICAL FIELD

The present invention relates to a two-dimensional image display device and, more particularly, to reduction in speckle noise in a two-dimensional scanning type image display device using a coherent light source as a light source.

BACKGROUND ART

FIG. 9 is a diagram illustrating a schematic structure of a conventional laser display.

The laser display 900 includes laser sources 901a~901c corresponding to three colors of R, G, B, and light modulators 905a~905c for intensity-modulating laser lights La~Lc emitted from the laser sources 901a~901c according to primary color signals Sa~Sc of an input video signal. Further, the laser display 900 includes a mirror 903 for reflecting the laser light La modulated by the optical modulator 906a, a dichroic mirror 902a for multiplexing the laser light La reflected at the mirror 903 and the laser light Lb modulated by the light modulator 906b, a dichroic mirror 902b for multiplexing the laser light La from the dichroic mirror 902a and the laser light Lc modulated by the light modulator 906c, and a condenser lens 904 for condensing the laser light multiplexed by the dichroic mirror 902b. Further, the laser display 900 includes a polygon scanner 906 for scanning the laser light condensed by the condenser lens 904, on a screen 908 in x direction, and a galvanometer scanner 907 for scanning the light from the polygon scanner 906 on the screen 908 in y direction so as to form a two-dimensional image. A two-dimensional beam scanning means of this laser display 900 is constituted by the polygon scanner 906 and the galvanometer scanner 907.

Next, the operation will be described.

The laser lights La~Lc from the laser sources 901a~901c corresponding to the three colors of R, G, and B are intensity modulated by the light modulators 905a~905c in accordance with the respective primary color signals Sa~Sc of the input video signal, and multiplexed by the optical system comprising the mirror 903 and the dichroic mirrors 902a and 902b, and the multiplexed light is applied to the condenser lens 904. Further, the laser light condensed by the condenser lens 904 is scanned in the x direction of the screen 908 by the polygon scanner 906 and is scanned in the y direction of the screen 908 by the galvanometer scanner 907, whereby a two-dimensional image can be displayed on the screen 908.

In the laser display 900, since the lights from the R, G, B light sources are high output monochromatic lights, respectively, a bright image of a high chromatic purity can be displayed by using laser sources of preferable wavelengths.

Another characteristic of the two-dimensional scanning type laser display shown in FIG. 9 is that uniform illumination can be obtained, without using a complicated optical element such as an integrator, in the optical system from the two-dimensional beam scanning means to the screen 908. For example, in a projector using a discharge tube or the like as a light source, which is presently available in the market, illumination intensity is made uniform using a light integrator comprising two lens arrays. However, the two-dimensional scanning type laser display can realize uniform illumination, regardless of the intensity distribution of the beam emitted from the light source, without using a large optical element for making the illumination intensity uniform.

Still another characteristic of the two-dimensional scanning type laser display is that, since the two-dimensional beam scanning means is used, a high-resolution and high-luminance image can be obtained. In a laser display using a spatial light modulator, a liquid crystal panel is generally used as a spatial light modulator. In this case, however, the beam power of the light source decreases due to scattering and absorption of light by the liquid crystal, and thereby the luminance of the light from the light source on the screen is deteriorated. On the other hand, in the laser display using the two-dimensional beam scanning means, a high-resolution image can be obtained by increasing the beam scanning rate. Further, since the laser display includes no optical system that decreases the laser power, the utilization efficiency of the laser power is high, and thereby a high-luminance image can be obtained.

In this laser display, however, there occurs a problem of so-called speckle noises in which bright-dot and dark-dot patterns are distributed at random, which are caused by that the high-coherence laser sources are used as light sources. The speckle noises are minute uneven noises which are caused by interferences of light beams which are scattered at the respective portions on the screen 908, when the laser light is scattered on the screen 908.

As a method for removing such speckle noises, there has conventionally been adopted a technique of changing the speckle patterns in a time shorter than the rewrite time of a display that can be sensed by human beings to average the speckle patterns, thereby preventing eyes of an observer from sensing the speckle noises.

For example, Patent Document 1 (Japanese Published Patent Application No.Sho.55-65940) discloses a method of eliminating speckle noises by vibrating a screen. Further, Patent Document 2 (Japanese Published Patent Application No.Hei.6-208089) discloses a method of eliminating speckle noises by disposing a diffusion element for diffusing coherent light on an optical path of the coherent light, and vibrating and rotating the diffusion element with an external force. Further, Patent Document 3 (Japanese Published Patent Application No.Hei.3-109591) discloses a method of preventing occurrence of speckle noises by applying particles of a birefringent crystal body to a screen, and projecting laser light whose polarization state is temporally varied, onto the screen.

DISCLOSURE OF THE INVENTION

Problems to be Solved by the Invention

However, the method of vibrating the screen (Patent Document 1) has a problem that a fixed wall surface or the like cannot be used as a screen.

Further, the method of vibrating and rotating the diffusion element (Patent Document 2) has a problem that a driving unit such as a motor for vibrating and rotating the diffusion element is needed, whereby the scale of the display device is undesirably increased, and the power consumption is increased, and further, vibration sound occurs.

Further, in the two-dimensional scanning type image display device as shown in FIG. 9, in order to realize high resolution image display, the scanning time for one pixel becomes $1/(60\times10^6)$ sec, assuming that the number of pictures to be displayed per second is 60, and the resolution of the screen is horizontal 1000 pixels×vertical 1000 pixels. Accordingly, in order to eliminate the speckle noises, it is necessary to vibrate the screen or the diffusion element at a modulation frequency of 60 MHz or more, which is higher than the scanning time for one pixel. The speckle elimination method using the object vibration system that is represented by the screen vibration has a problem that it cannot follow the beam scanning speed that realizes a high resolution image display.

On the other hand, the method of applying the birefringent crystal body to the screen, which is disclosed in Patent Document 3, has a problem that the crystal must be applied over the entirety of the screen, leading to an increase in cost.

The present invention is made to solve the above-described problems, and has for its object to provide a two-dimensional image display device, which is capable of removing speckle noises as well as simple in construction and excellent in quietness and durability.

Measures to Solve the Problems

According to Claim 1 of the present invention, there is provided a two-dimensional image display device for displaying an image by projecting coherent light on a projection plane, comprising: at least one coherent light source for outputting coherent light; a polarization state modulator for modulating at least one of a polarization state and a phase of the coherent light emitted from the coherent light source; and a birefringent diffusion plate for spatially varying the phase of the coherent light emitted from the polarization state modulator; wherein the coherent light, the phase of which is varied by the polarization state modulator, is projected onto the projection plane.

Therefore, a driving system for vibrating or rotating the screen or the diffusion plate is dispensed with, whereby minimization and cost reduction of the two-dimensional image display device can be achieved, and further, quietness and durability can be improved.

According to Claim 2 of the present invention, in the two-dimensional image display device defined in Claim 1, the birefringent diffusion plate and the projection plane are in an image forming relation.

Therefore, it is avoided that unevenness on the birefringent diffusion plate appears on the projected image, whereby a high-definition image can be obtained.

According to Claim 3 of the present invention, in the two-dimensional image display device defined in Claim 1, the birefringent diffusion plate has a coherent light incident plane which is spatially regionally divided, and the respective regions have directions of their optical axes which are randomly set.

Therefore, the phase of the coherent light can be spatially varied, whereby many speckle patterns are generated to reduce speckle noise. Further, since the birefringent diffusion plate can be fabricated by patterning using photolithography or the like, fabrication of the birefringent diffusion plate is simplified.

According to Claim 4 of the present invention, in the two-dimensional image display device defined in Claim 1, the birefringent diffusion plate has a coherent light incident plane which is spatially regionally divided, and random phase delay amounts of the coherent light are generated in the respective regions.

Therefore, the phase of the coherent light can be spatially varied, whereby many speckle patterns are generated to reduce speckle noise.

Further, since the birefringent diffusion plate can be fabricated by randomly varying the thickness of a material having a birefringence, fabrication of the birefringent diffusion plate can be easily carried out by etching or the like.

According to Claim 5 of the present invention, in the two-dimensional image display device defined in Claim 1, the birefringent diffusion plate has a coherent light incident plane which is spatially regionally divided, and the respective regions have directions of their optical axes which are randomly set, and generate random phase delay amounts of the coherent light.

Therefore, the speckle patterns on the screen can be diversified, whereby the speckle noise can be further reduced.

According to Claim 6 of the present invention, in the two-dimensional image display device defined in Claim 1, two or more pieces of the birefringent diffusion plates are disposed on an optical path from the coherent light source to the projection plane.

Therefore, the speckle patterns on the screen can be more diversified, whereby the speckle noise can be further reduced.

According to Claim 7 of the present invention, in the two-dimensional image display device defined in Claim 4 or 5, in the birefringent diffusion plate, the phase delay amount $\Delta\phi$ satisfies $0\leq\Delta\phi\leq2\pi$, and the phase delay amount is generated at an approximately uniform rate.

Therefore, it is not necessary to produce a difference in thickness larger than a predetermined amount when processing the birefringent diffusion plate, whereby the processing can be simplified.

According to Claim 8 of the present invention, in the two-dimensional image display device defined in Claim 1, the birefringent diffusion plate is formed of a ferroelectric crystal.

Therefore, the refractive-index distribution can be varied by electric field control, whereby the speckle patterns on the screen can be more diversified.

According to Claim 9 of the present invention, in the two-dimensional image display device defined in Claim 1, the birefringent diffusion plate includes a liquid crystal as a component material.

Therefore, the birefringent diffusion plate can be fabricated inexpensively.

According to Claim 10 of the present invention, in the two-dimensional image display device defined in Claim 1, two pieces of the polarization state modulators are disposed in series on an optical path from the coherent light source to the projection plane so that the directions of optical axes of the polarization state modulators are different from each other.

Therefore, arbitrary speckle patterns can be produced, whereby the speckle noise can be further reduced.

According to Claim 11 of the present invention, in the two-dimensional image display device defined in Claim 10, the two polarization state modulators modulate at least one of the polarization state and the phase of the coherent light emitted from the coherent light source, with different frequencies from each other.

Therefore, the speckle patterns on the screen can be diversified, whereby the speckle noise can be further reduced.

According to Claim 12 of the present invention, in the two-dimensional image display device defined in Claim 1, the polarization state modulator and the birefringent diffusion plate are integrally fabricated.

Therefore, the two-dimensional image display device can be miniaturized.

According to Claim 13 of the present invention, the two-dimensional image display device defined in Claim 1 further includes a two-dimensional beam scanning system for scanning the coherent light emitted from the coherent light source in a two-dimensional direction so that an image is displayed on the projection plane.

Therefore, in the two-dimensional scanning type image display device, a high-quality image from which speckle noise is removed can be obtained.

According to Claim 14 of the present invention, in the two-dimensional image display device defined in Claim 1, the polarization state modulator modulates at least one of the polarization state and the phase of the coherent light emitted from the coherent light source, with a frequency f that satisfies formula (1) as follows:

$$f \geq X \times Y \times N (\text{Hz}) \quad (1)$$

wherein X is the number of pixels in the horizontal direction of the image displayed on the projection plane, Y is the number of pixels in the vertical direction of the image displayed on the projection plane, and N is the number of pixels displayed per second.

Therefore, in the two-dimensional scanning type image display device, a high-quality image from which speckle noise is removed can be obtained.

According to Claim 15 of the present invention, in the two-dimensional image display device defined in Claim 1, the polarization state modulator is an optical modulator using electro-optical effect.

Therefore, the polarization state of the laser light can be modulated in MHz order or GHz order, whereby the speckle noise can be removed in the two-dimensional scanning type image display device.

Effect of the Invention

In the two-dimensional image display device according to the present invention, since the optical system for removing speckle noise is constituted by a polarization state modulator and a birefringent diffusion plate, a driving system for vibrating or rotating the screen or the diffusion plate is dispensed with, whereby miniaturization and cost reduction can be achieved, and further, quietness and durability can be improved.

Furthermore, since the two-dimensional image display device of the present invention employs the high-speed polarization state modulator, the speckle patterns can be varied at high speed. Therefore, the two-dimensional image display device of the present invention is applicable to a two-dimensional scanning type high-resolution image display device, and it is possible to project a vivid and high-definition image which has no minute and uneven noises, onto a screen.

BRIEF DESCRIPTION OF THE DRAWINGS

FIG. 2 is a diagram for explaining the operation of the first embodiment, conceptually illustrating an optical system for one color of the two-dimensional image display device.

Figure 1:
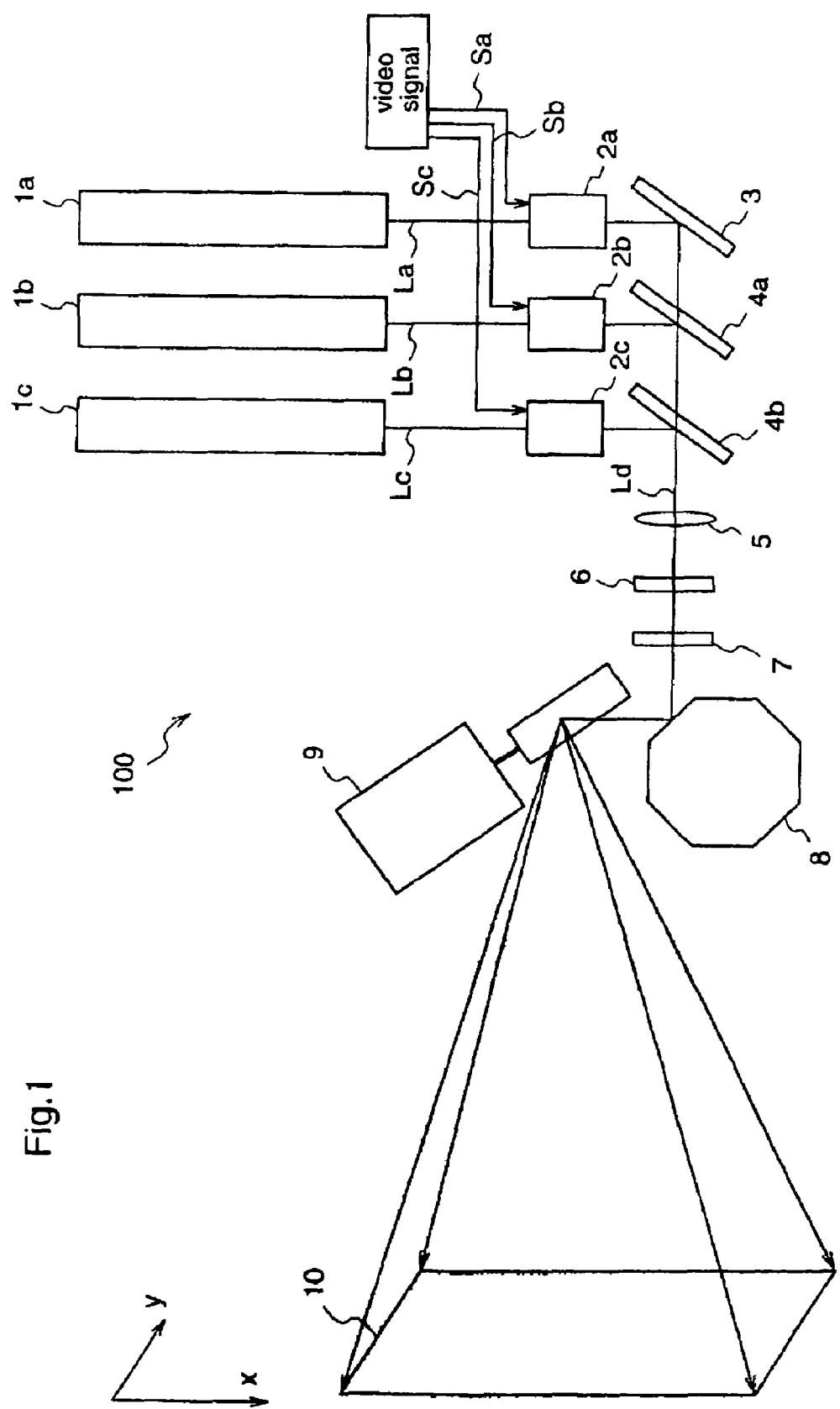
FIG. 1 is a diagram illustrating a schematic construction of a two-dimensional image display device according to a first embodiment of the present invention.

DESCRIPTION OF REFERENCE NUMERALS 1a,1b,1c . . . laser sources
2a,2b,2c . . . light modulators
3 . . . mirror
4a, 4b . . . dichroic mirrors
5 . . . condenser lens
6 . . . polarization state modulator
7 . . . birefringent diffusion plate
8 . . . polygon scanner
9 . . . galvanometer scanner
10 . . . screen
13 . . . projection lens 14 ... electrode
901a,901b,901c ... laser sources
902a,902b ... dichroic mirrors
903 ... mirror
904 ... condenser lens
905a,905b,905c ... light modulators
906 ... polygon scanner
907 ... galvanometer scanner
908 ... screen

BEST MODE TO EXECUTE THE INVENTION

Hereinafter, embodiments of the present invention will be described with reference to the drawings.

Embodiment 1

FIG. 1 is a diagram illustrating a schematic construction of a two-dimensional image display device according to a first embodiment of the present invention.

The two-dimensional image display device 100 shown in FIG. 1 includes laser sources 1a~1c corresponding to three colors of R, G, B, and light modulators 2a~2c for intensity-modulating laser lights La~Lc emitted from the laser sources 1a~1c according to primary color signals Sa~Sc of an input video signal. The laser sources 1a, 1b, and 1c may be vapor lasers such as He—Ne lasers, He—Cd lasers, or Ar lasers, semiconductor laser such as AlGaInP or GaN system lasers, or SHG (Second Harmonic Generation) lasers having an output of a solid laser as a base wave.

Further, the laser display 100 includes a mirror 3 for reflecting the laser light La modulated by the optical modulator 2a, a dichroic mirror 4a for multiplexing the laser light La reflected at the mirror 3 and the laser light Lb modulated by the light modulator 2b, and a dichroic mirror 4b for multiplexing the laser light La from the dichroic mirror 4a and the laser light Lc modulated by the light modulator 2c to generate laser light Ld.

Further, the laser display 100 includes a condenser lens 5 or condensing the laser light Ld multiplexed by the dichroic mirror 4b, a polarization state modulator 6 for temporally changing at least one of the polarization state and the phase of the laser light Ld condensed by the condenser lens 5 by utilizing electro-optical effect (EO), and a birefringent diffusion plate 7 for changing the phase pattern in a beam cross-section of the laser light Ld emitted from the polarization state modulator 6.

Further, the laser display 100 includes a polygon scanner 8 for making the laser light Ld emitted from the birefringent diffusion plate 7 scan the screen 10 in the x direction, and a galvanometer scanner 9 for making the light from the polygon scanner 8 scan the screen 10 in the y direction so as to form a two-dimensional image on the screen 10.

Next, the operation will be described.

The lights emitted from the red laser source 1a, the green laser source 1b, and the blue laser source 1c are intensity-modulated by the light modulators 2a~2c according to the input video signals Sa~Sc, and multiplexed by the dichroic mirrors 4a and 3b to be laser light Ld that enter the condenser lens 5.

The laser light Ld condensed by the condenser lens passes through the polarization state modulator 6 and the birefringent diffusion plate 7, and enters the polygon scanner 8. Then, the laser light Ld scans the screen in the x direction by the polygon scanner 8, and scans the screen in the y direction by the galvanometer scanner 9. Each of the respective light irradiation regions formed on the screen by the laser light, i.e., each of the individual light spots, correspond to one pixel of an image displayed over the screen 10, and the entire two-dimensional image is displayed when the laser light scans the two-dimensional screen 10.

At this time, if the time required for scanning one frame entirely is shorter than the time of afterimage of human eyes, the observer can observe the entire two-dimensional image without being conscious of scanning by the laser light on the screen. Further, when displaying a moving image, it is possible to display a smooth moving image by scanning the entire screen within a display time for one frame.

Next, a description will be given of the principle of suppressing speckle noise in the two-dimensional image display device 100 according to the first embodiment.

Figure 9:
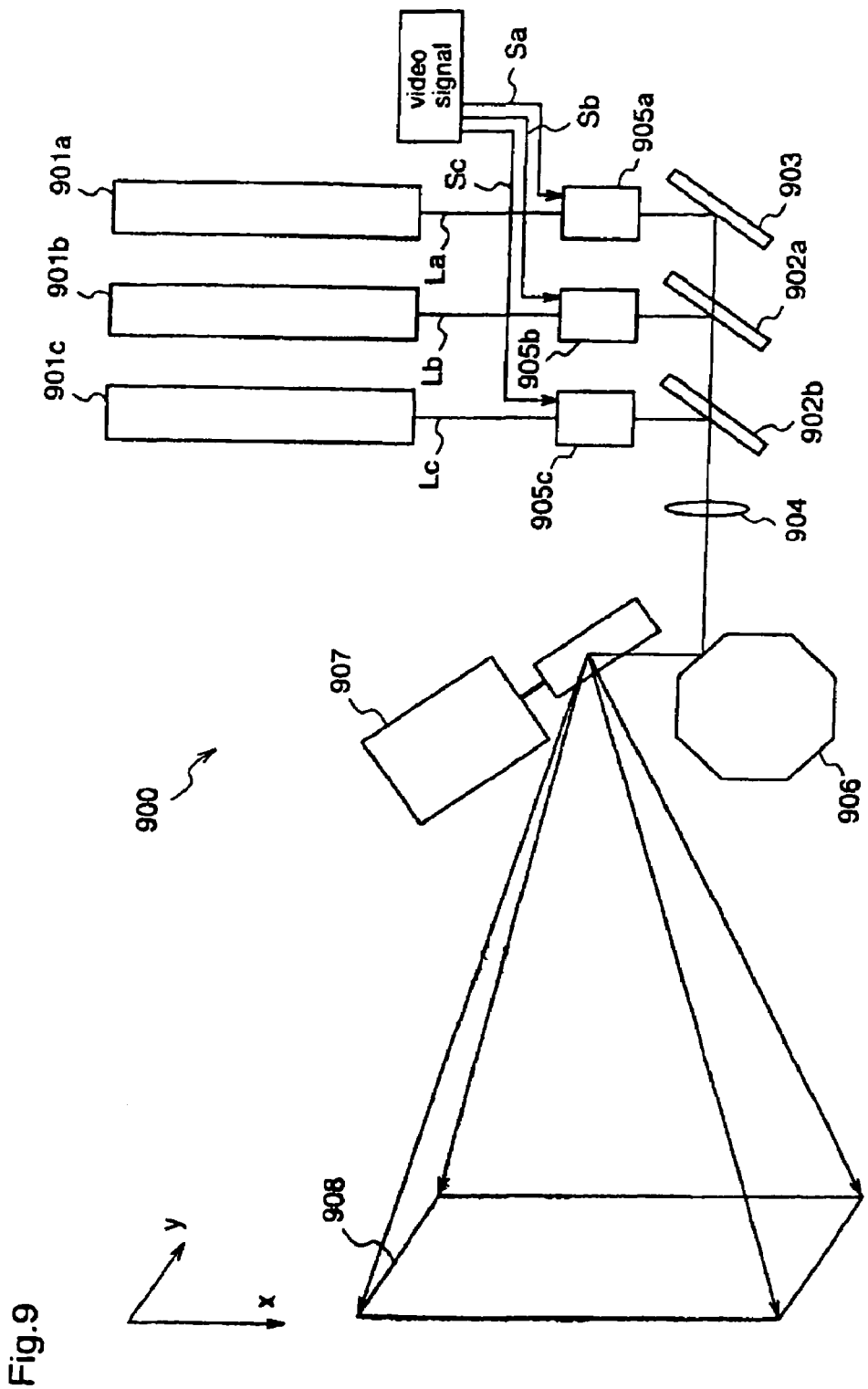
FIG. 9 is a diagram illustrating the schematic construction of the conventional laser image display device.

In the conventional laser display 900 shown in FIG. 9, the laser light from the laser source which passes through the multiplexing optical system Comprising the dichroic mirrors 4a and 4b is almost condensed before being scanned by the polygon scanner 906 to form a light spot, and the light spot is projected on the screen 908 by the two-dimensional beam scanning system comprising the polygon scanner 906 and the galvanometer scanner 907. In a point indicating one pixel on the screen 908, speckle noise exists as described above.

So, in the two-dimensional image display device 100 according to the first embodiment, the polarization state modulator 6 and the birefringent diffusion plate 7 are disposed between the polygon scanner 8 and the condenser lens 5, and at least one of the polarization state and the phase of the condensed laser light which enters the polygon scanner 8 is temporally changed, and further, the phase pattern of the laser light is varied.

FIG. 2 is a diagram conceptually illustrating an optical system 200 for one color that is extracted from the two-dimensional image display device 100. In FIG. 2, reference numeral 1 denotes a light source which is any of the red laser source 1a, the green laser source 1b, and the blue laser source 1c. Reference numeral 12 denotes a two-dimensional beam scanning system comprising the polygon scanner and the galvanometer scanner 9. Further, reference numeral 13 denotes a projection lens for enlarging and projecting the laser light Ld from the two-dimensional beam scanning system on the screen 10. In FIG. 2, the same constitutes as those shown in FIG. 1 are given the same reference numerals. The birefringent diffusion plate 7 and the screen 10 are disposed so as to make a relationship of image formation.

In the optical system 200 shown in FIG. 2, the speckle noise is removed as follows.

Initially, the polarization state modulator 6 temporally changes at least one of the polarization state and the phase of the laser light Ld emitted from the condenser lens 5. At this time, which one of the polarization state of the laser light Ld, the phase of the laser light Ld, and both of the polarization state and the phase should be changed, depends on the control voltage applied to the polarization state modulator 6. Then, the birefringent diffusion plate 7 changes the phase of the laser light Ld emitted from the polarization state modulator 6, spatially at random, according to the polarization state of the laser light Ld. That is, since the polarization state of the laser light Ld incident on the birefringent diffusion plate 7 temporally changes, the phase pattern of the laser light Ld emitted from the birefringent diffusion plate 7 also changes temporally and spatially.

When such laser light Ld is projected onto the screen 10, the speckle patterns that occur on the screen 10 change temporally. When the observer observes the image or video displayed on the screen 10, these plural speckle patterns are visually averaged and thereby the minute and uneven noise image is removed. At this time, in the expansion projection system, the laser light Ld on the birefringent diffusion plate 7 and the laser light Ld expanded on the screen 10 correspond one to one with respect to the projection lens 13, thereby preventing reduction in the resolution of the image displayed on the screen 10, which reduction might occur due to scattering of the laser light Ld when it is emitted from the birefringent diffusion plate 7

Next, the polarization state modulator 6 and the birefringent diffusion plate 7 according to the first embodiment will be briefly described.

In this first embodiment, an EO polarization element utilizing electro-optical effect (EO) is used as the polarization state modulator 6. More specifically, a Z-plate $LiNbO_3$ having ±Z planes on which electrodes are formed is employed. The polarization element utilizing the EO effect can response to an increase in the modulation speed, and it is suitable for the two-dimensional scanning type high-resolution image display device like the two-dimensional image display device 100 of the first embodiment.

That is, in the two-dimensional scanning type image display device, the polarization state of the laser light Ld must be changed at a modulation speed that is higher than the two-dimensional scanning speed. For example, when image display is carried out with the display time for one frame being 1/60 sec and the frame resolution being horizontal 1000×vertical 1000 pixels, the scanning time for each pixel becomes $1/(60 \times 10^6)$ sec, and the polarization direction of the laser light Ld must be modulated with a modulation frequency of 60 MHz or more. Since the EO polarization element can perform modulation with the modulation frequency of 60 MHz or more, it can sufficiently cope with the case where high-speed modulation is required as in the two-dimensional scanning type image display device.

The modulation frequency of the polarization state modulator 6 should be set so that the modulation speed becomes higher than the two-dimensional scanning speed as described above, and the speckle patterns on the screen 10 vary a higher speed as the modulation frequency of the polarization state modulator 6 is higher, whereby the speckle noise on the screen 10 is further reduced. For example, when the case where the modulation frequency is 60 MHz is compared with the case where it is 600 MHz that is ten times higher than 60 MHz, an image where the speckle noise is further removed can be obtained when the modulation frequency is 600 MHz. The polarization state modulator 6 may be an optical modulator using an effect other than the EO effect so long as it can vary the polarization state with a modulation speed higher than the two-dimensional scanning speed.

Next, the birefringent diffusion plate 7 will be described.

Figure 3A:
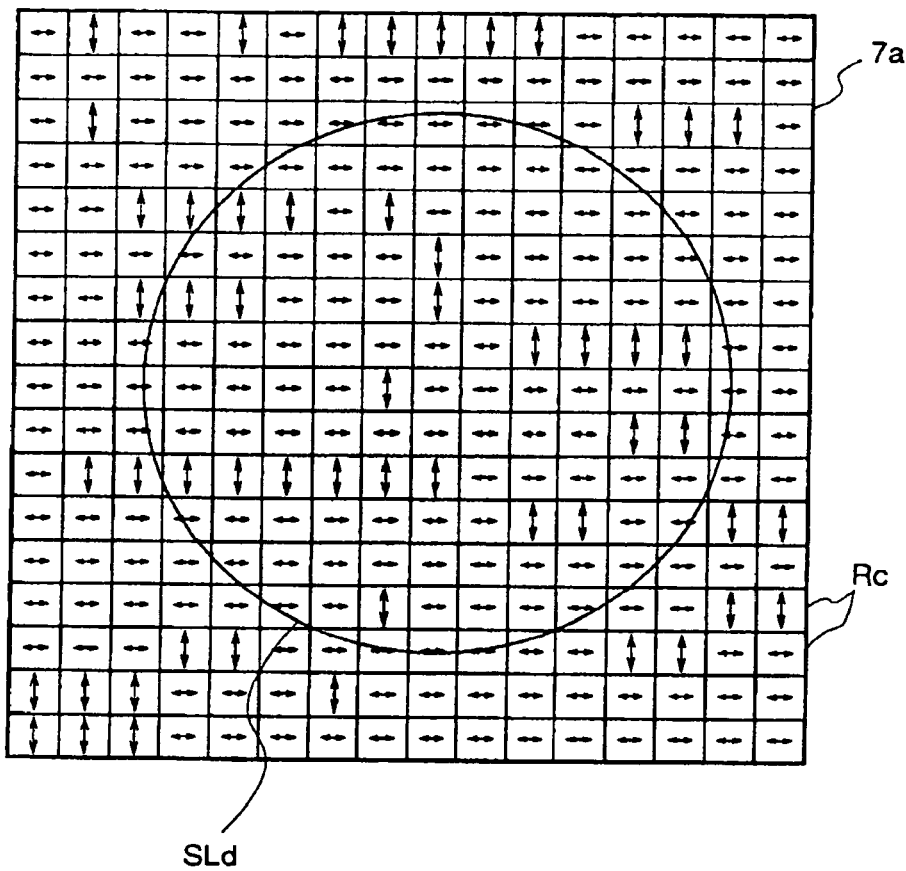
FIG. 3(a) is a plan view for explaining a birefringent diffusion plate of the two-dimensional image display device according to the first embodiment.

FIG. 3(a) is a plan view illustrating the birefringent diffusion plate 7. In FIG. 3(a), SLd indicates a spot diameter of the laser light Ld, and arrows indicate optical axes (hereinafter referred to as "C axes").

The birefringent diffusion plate 7 is as large as or larger than the light spot diameter as shown in FIG. 3(a), and it is obtained by that a substrate comprising a material whose refractive index varies depending on the polarization direction of incident light, i.e., a material having birefringence, is partitioned in a reticular pattern to form plural cell regions Rc, and the orientations of the optical axes of the respective cell regions Rc are irregularly set. That is, in the birefringent diffusion plate 7, fast axes (axes of small refractive indexes) and slow axes (axes of large refractive indexes) of the respective cell regions are irregularly arranged, and the orientations of the C axes of the respective cell regions are irregular on the two-dimensional space.

As a specific method of fabricating the birefringent diffusion plate 7, for example, patterning of a resist on a glass substrate, and oblique evaporation of a dielectric thin film ($MgF_2$) having birefringence are carried out for several times, thereby randomly setting the orientations of the C axes of the respective cell regions. As a material of the birefringent diffusion plate 7 other than the above-mentioned ferroelectric crystal, a liquid crystal having large birefringence may be used.

When determining the cell widths of the respective cell regions constituting the birefringence diffusion plate 7, it is necessary to consider the diffusion angle of the laser light Ld so as not to affect the beam uptake efficiency of the projection lens 13. The reason is as follows. When the diffusion angle becomes large, the beam uptake efficiency of the projection lens shown in FIG. 2 degrades, and thereby the luminance of the image projected on the screen 10 degrades. For example, when a diffusion plate corresponding to the birefringent diffusion plate 7 is fabricated by applying the particles of the birefringence crystal used in the speckle noise removal method disclosed in Patent Document 3 to a transparent plate-shaped material, since the diameters of the particles of the birefringence crystal are small or the cross-section of the surface to which the particles are applied becomes irregular, the laser light Ld repeats refraction and reflection, whereby the diffusion angle of the laser light is increased. Therefore, in the optical system of the first embodiment, it is difficult to insert the diffusion plate on which birefringent particles are applied, before projection.

In the optical system 200 of the first embodiment, assuming that the cell width of the birefringent diffusion plate 7 is d, since the relationship of the diffusion angle $\Delta\theta$ to the light of wavelength $\lambda$ is $\Delta\theta = \lambda/d$, the diffusion angle $\Delta\theta$ depends on the cell width, and the diffusion angle decreases as the cell width increases. Therefore, in this first embodiment, the cell width d is 10 μm. When the cell width d is 10 μm and green light having a wavelength $\lambda$ of 500 nm is adopted, the diffusion angle $\Delta\theta$ is 0.5/10=50 mrad (~3°), and it is confirmed that this diffusion angle does not affect the uptake efficiency of the projection lens.

Next, the function and effect of the birefringent diffusion plate 7 will be described.

Figure 3B:
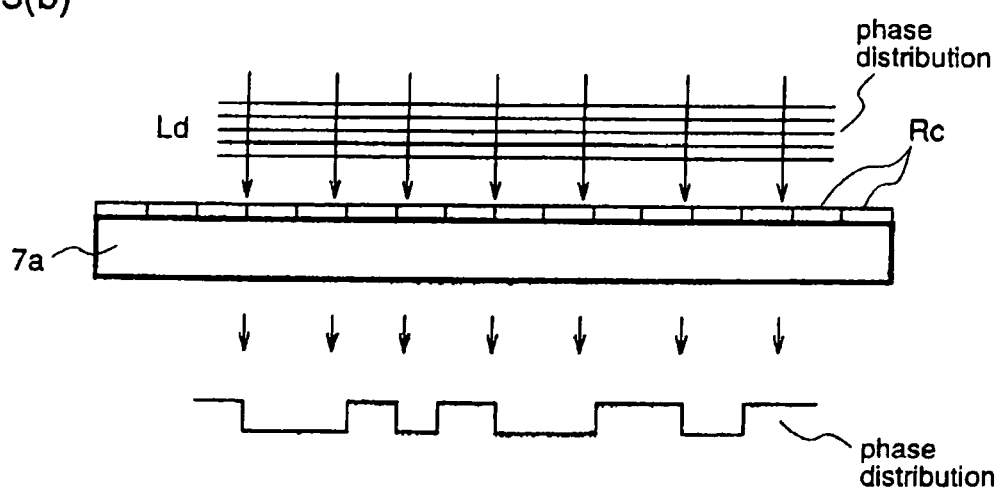
FIG. 3(b) is a cross-sectional view for explaining the birefringent diffusion plate of the two-dimensional image display device according to the first embodiment, schematically illustrating the phase states of laser light incident on the birefringent diffusion plate and laser light emitted from the birefringent diffusion plate.

FIG. 3(b) is a diagram illustrating the cross-sectional structure of the birefringent diffusion plate 7, wherein the phase distributions of the laser light Ld incident on the birefringent diffusion plate 7 and the laser light Ld emitted from the birefringent diffusion plate 7 are schematically shown.

In FIG. 3(b), it is assumed that linear-polarized coherent laser light Ld enters the birefringent diffusion plate 7. For simplification, the laser light Ld has two polarization directions, i.e., a direction parallel to the C axis direction and a direction perpendicular to the C axis direction. Assuming that the refractive index to the laser light Ld whose polarization direction is parallel to the C axis direction is n1 while the refractive index to the laser light Ld whose polarization direction is perpendicular to the C axis direction is n2, a relationship of n1≠n2 is established because each cell region of the birefringent diffusion plate 7 has birefringence. Accordingly, the optical path lengths obtained when the laser lights Ld having different polarization directions pass through the birefringent diffusion plate 7 are different from each other, and the laser lights emitted from the birefringent diffusion plate 7 are out of phase with each other. That is, the phase pattern of the laser light Ld incident on the birefringent diffusion 7 varies, after passing through the birefringent diffusion plate 7, with phase differences that occur as shown in FIG. 3(b), in accordance with the distributions of the respective cell regions in the C axis direction on the birefringent diffusion plate 7.

Then, the phase pattern of laser light emitted from the birefringent diffusion plate 7 can be temporally and spatially varied by temporally varying the polarization state of the laser light Ld, i.e., the polarization direction and the polarization type, by the polarization state modulator 6.

As described above, in the two-dimensional image display device 100 according to the first embodiment, at least one of the polarization state and the phase of the laser light Ld is temporally changed by the polarization state modulator 6 utilizing the EO effect, and the phase pattern of the laser light Ld from the polarization state modulator 6 is randomly varied by the birefringent diffusion plate 7 comprising plural materials having birefringence. Therefore, a lot of different speckle patterns are generated on the screen 10, thereby obtaining a two-dimensional image with suppressed speckle noise.

According to the first embodiment, in the birefringent diffusion plate 7, the respective cell regions Rc having birefringence are disposed so that the C axis directions thereof correspond to the mutually-perpendicular two directions. However, the birefringent diffusion plate is not restricted to that in which the C axis directions of the cell regions Rc correspond to the mutually-perpendicular two directions.

Figure 4A:
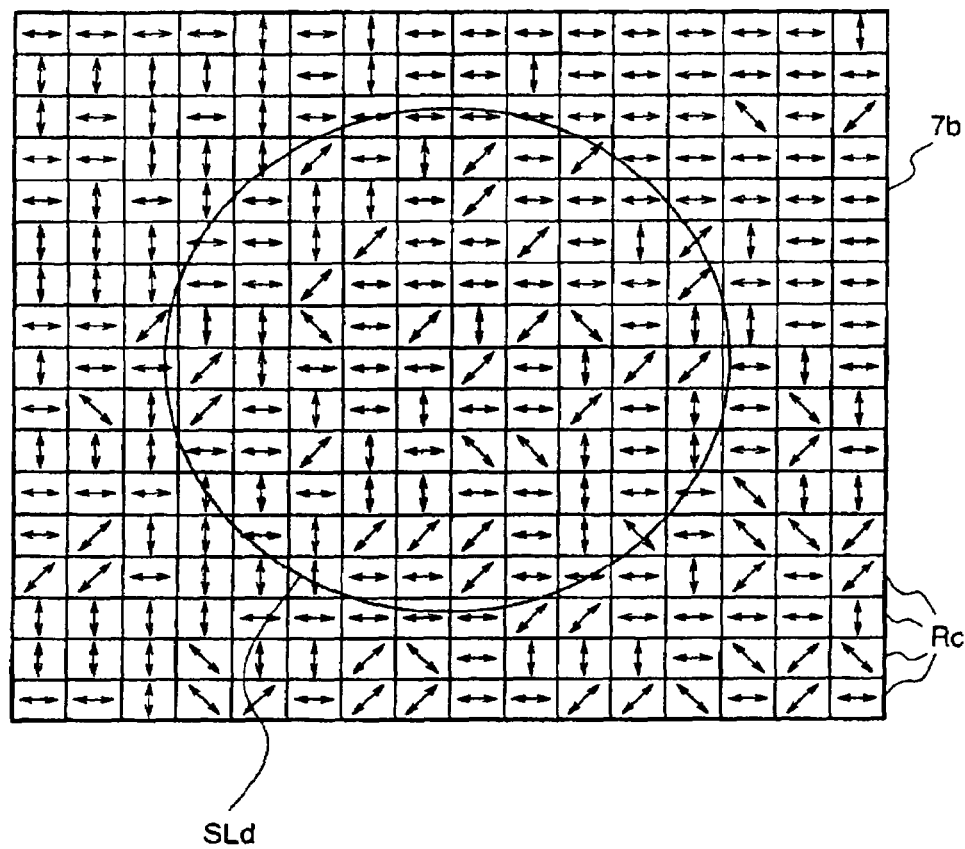
FIG. 4(a) is a plan view for explaining another example of the birefringent diffusion plate of the two-dimensional image display device according to the first embodiment.
Figure 4B:
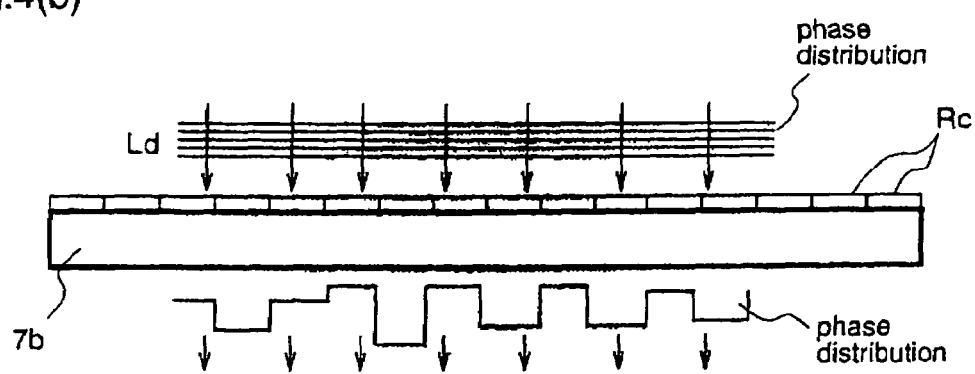
FIG. 4(b) is a cross-sectional view for explaining another example of the birefringent diffusion plate of the two-dimensional image display device according to the first embodiment, schematically illustrating the phase states of laser light incident on the birefringent diffusion plate and laser light emitted from the birefringent diffusion plate.

For example, as shown in FIG. 4(a), when the respective cell regions of the birefringent diffusion plate are disposed in a two-dimensional space so that the C axes thereof are randomly oriented, more phase patterns can be formed as shown in FIG. 4(b), thereby displaying a high-quality image in which speckle noise is further reduced. The birefringent diffusion plate 7b shown in FIG. 4(a) can be fabricated by photolithography or the like in the same way as described for the birefringent diffusion plate 7a.

Further, while in this first embodiment the two-dimensional image display device is of the two-dimensional scanning type that scans the screen with laser light to display an image, the two-dimensional image display device may be of a spatial modulation type that modulates laser light by a spatial light modulator on the basis of a video signal and projects the laser light on the screen.

Further, while in this first embodiment the laser sources 1a~1c are used as light sources of the two-dimensional image display device, the light sources of the two-dimensional image display device are not restricted to laser sources. Even a lamp or an LED is applicable as a light source of the two-dimensional image display device so long as it is highly coherent.

Further, while in this first embodiment, the optical system of the two-dimensional image display device includes only one birefringent diffusion plate 7, the optical system of the two-dimensional image display device may include plural birefringent diffusion plates. For example, when the optical system of the two-dimensional image display device has two or more birefringent diffusion plates which are disposed in series with respect to the light beam propagating direction, the speckle pattern can be further diversified as compared with the case where the optical system has only one birefringent diffusion plate, leading to further reduction in the speckle noise.

Embodiment 2

Figure 5A:
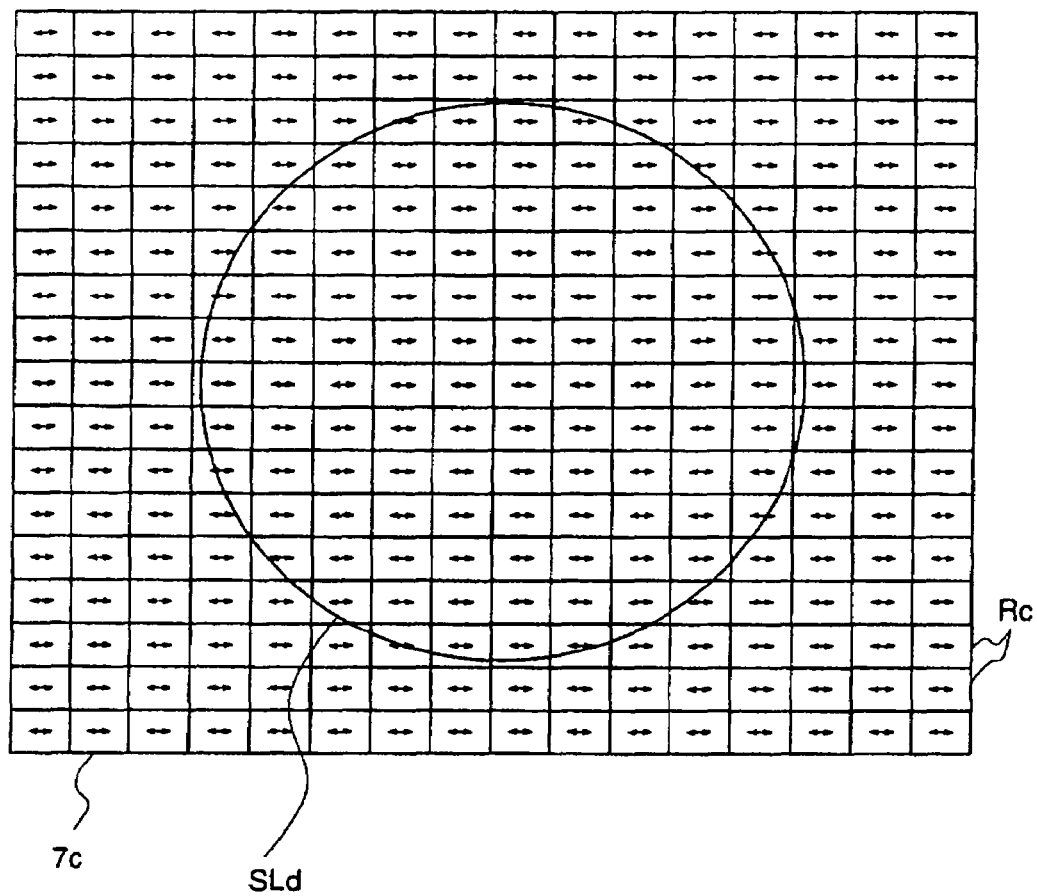
FIG. 5(a) is a plan view for explaining a birefringent diffusion plate of a two-dimensional image display device according to a second embodiment.
Figure 5B:
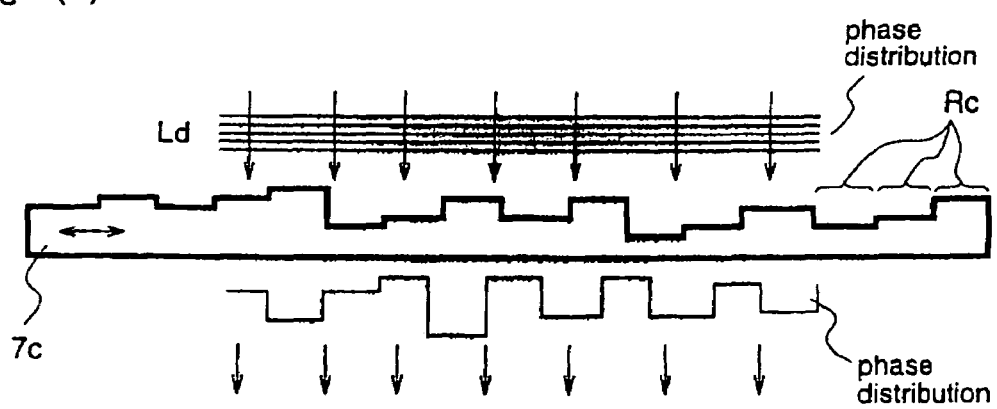
FIG. 5(b) is a cross-sectional view for explaining the birefringent diffusion plate of the two-dimensional image display device according to the second embodiment, schematically illustrating the phase states of laser light incident on the birefringent diffusion plate and laser light emitted from the birefringent diffusion plate.

FIGS. 5(a) and 5(b) are diagrams for explaining a two-dimensional image display device according to a second embodiment of the present invention. FIG. 5(a) is a plan view illustrating a birefringent diffusion plate 7c as a constituent of the two-dimensional image display device. FIG. 5(b) illustrates a cross-sectional structure of the birefringent diffusion plate 7c, and schematically illustrates phase distributions of illumination light incident on the birefringent diffusion plate 7c and illumination light emitted from the birefringent diffusion plate 7c.

The two-dimensional image display device according to the second embodiment uses the birefringent diffusion plate 7c in which the thickness of a substrate comprising a material having birefringence is spatially varied at random, instead of the birefringent diffusion plate 7 of the two-dimensional image display device 100 of the first embodiment. Accordingly, other constituents of this second embodiment are identical to those of the first embodiment.

In the birefringent diffusion plate 7c of this second embodiment, a substrate comprising a material having birefringence is partitioned so that plural cell regions Rc are arranged in a reticular pattern, and then the substrate is processed so that the cell regions Rc having different thicknesses are arranged at random. In this second embodiment, as a material substrate of the birefringent diffusion plate 7c, a $LiNbO_3$ substrate is adopted, and the thicknesses of the substrate in the respective cell regions are varied by etching or laser processing.

A specific method for fabricating the birefringent diffusion plate 7c is as follows. Assuming that the wavelength of passing light is $\lambda$, the birefringent index difference (difference between the refractive index of ordinary light and the refractive index of abnormal light) is $\Delta n$, and the maximum difference in substrate thicknesses in the plane of the diffusion plate is $\Delta t$, a relationship of $\lambda \leq \Delta n \times \Delta t$ should be satisfied to obtain sufficient diffusion. Since the birefringent index difference $\Delta n$ of the $LiNbO_3$ substrate is about 0.09, when laser light having a wavelength of 600 nm is used, the $LiNbO_3$ substrate is processed by etching or the like so as to have a thickness difference of 7 μm or more.

Next, the function and effect will be described.

In FIG. 5(a), it is assumed that linear-polarized coherent laser light Ld enters the birefringent diffusion plate 7c. Since, in the birefringent diffusion plate 7c, the substrate thickness is set for each cell region at random, when the laser light Ld passes through the birefringent diffusion plate 7c, phase delays occur in portions of the laser light Ld that pass through the respective cell regions, according to the substrate thicknesses of the respective cell regions, whereby the laser light Ld emitted from the birefringent diffusion plate 7c becomes to have a spatially random phase pattern as shown in FIG. 5(b).

Further, since the polarization state of the laser light Ld incident on the birefringent diffusion plate 7c temporally varies as in the first embodiment, the phase pattern of the laser light Ld emitted from the birefringent diffusion plate 7c varies spatially and temporally. Therefore, on the screen 10, a lot of different speckle patterns occur. When an observer observes a projected image, the observer can observe a two-dimensional image in which these speckle patterns are temporally averaged and thereby speckle noise is reduced.

As described above, in the two-dimensional image display device according to the second embodiment, since the birefringent diffusion plate 7c is constructed such that the substrate thickness is randomly varied for each cell region, it is possible to remove speckle noise by the birefringent diffusion plate of the simple construction, as in the first embodiment.

While in this second embodiment the birefringent diffusion plate 7c is obtained by processing the surface of the LiNbO$_3$ substrate as a material substrate, the birefringent diffusion plate 7c is not restricted thereto. For example, a liquid crystal may be sealed in a hollow transparent member whose substrate thickness is irregularly varied, whereby a birefringent diffusion plate of a simple construction can be obtained, like the birefringent diffusion plate 7c using LiNbO$_3$ according to the second embodiment. At this time, transparent electrodes may be randomly disposed on the surface of the hollow transparent member, whereby an electric field can be applied to the liquid crystal that is sealed in the hollow transparent member to spatially and randomly vary the orientation of the liquid crystal sealed in the transparent member. As a result, more phase patterns can be produced, leading to further reduction in speckle noise. Further, since the liquid crystal is cheaply available, the production cost of the birefringent diffusion plate can be reduced.

Further, in this second embodiment, the birefringent diffusion plate 7c is constructed such that the cell regions of different thicknesses are randomly arranged, and the C axis directions in the respective cell regions are constant. However, in the birefringent diffusion plate 7c, not only the substrate thicknesses but also the C axis directions in the respective cell regions may be randomly set for the respective cell regions.

Figure 6A:
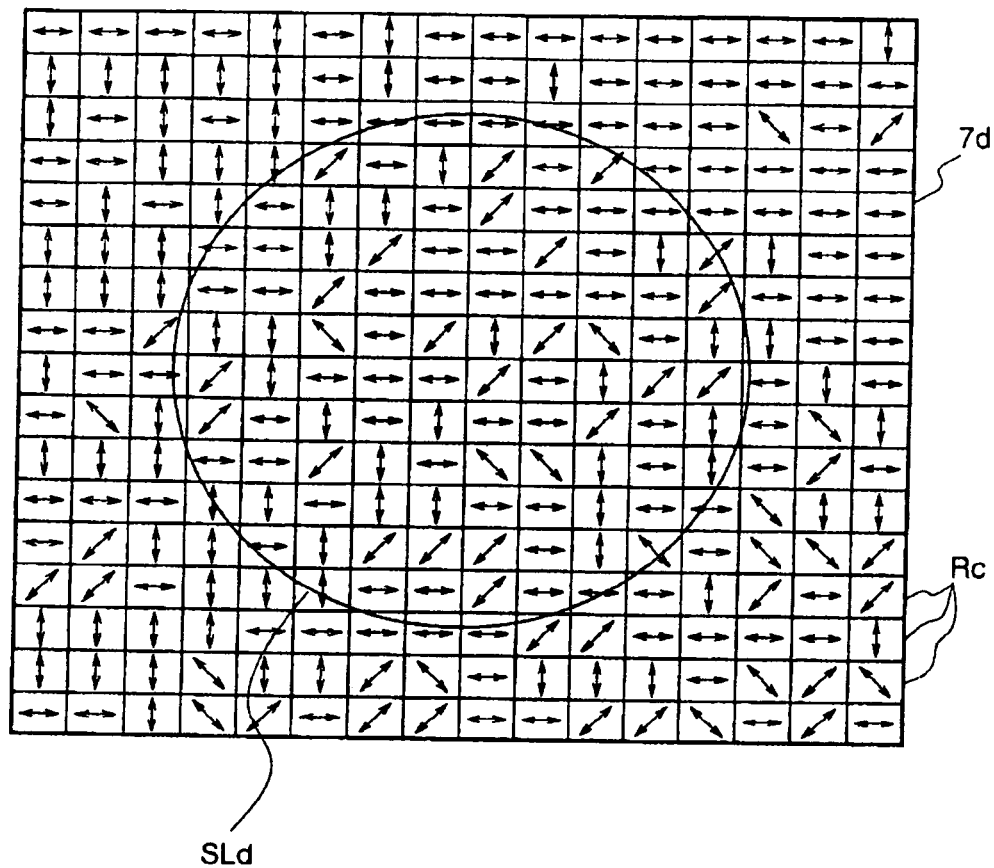
FIG. 6(a) is a plan view for explaining another example of the birefringent diffusion plate of the two-dimensional image display device according to the second embodiment.

FIG. 6(a) is a plan view illustrating such birefringent diffusion plate 7d.

The birefringent diffusion plate 7d is obtained by modulating the birefringent diffusion plate 7c of the second embodiment so that the C axis directions of the respective cell regions become random directions.

Figure 6B:
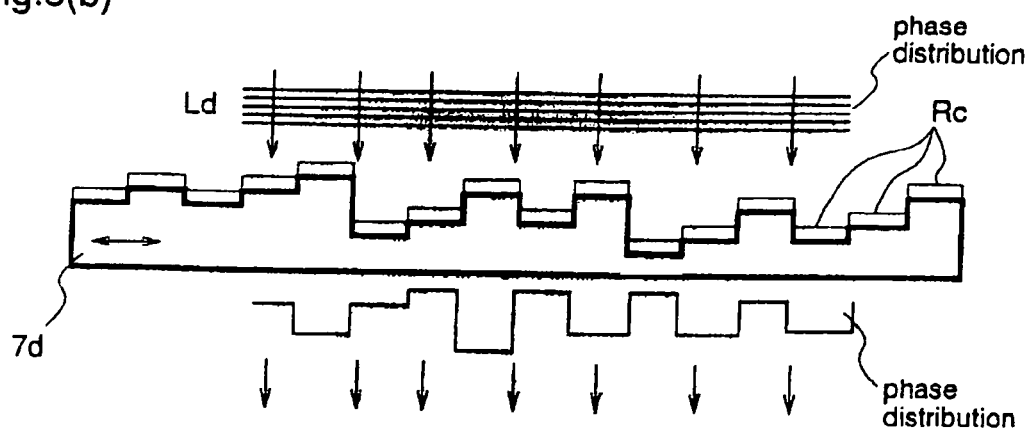
FIG. 6(b) is a cross-sectional view for explaining another example of the birefringent diffusion plate of the two-dimensional image display device according to the second embodiment, schematically illustrating the phase states of laser light incident on the birefringent diffusion plate and laser light emitted from the birefringent diffusion plate.

In the birefringent diffusion plate 7d, more phase patterns can be produced as shown in FIG. 6(b).

Further, while in the second embodiment the optical system of the two-dimensional image display device includes only one birefringent diffusion plate 7c, the two-dimensional image display device may include plural birefringent diffusion plates 7c arranged in series along the optical axis of the optical system. In this case, the speckle pattern can be more diversified as compared with the case where the optical system has only one birefringent diffusion plate, leading to further reduction in the speckle noise. When using plural birefringent diffusion plates 7c in which the C axes of the respective cell regions are orientated in the constant direction as shown in FIG. 5(a), the plural birefringent diffusion plates 7c are desired to be arranged so that the directions of the fast axes and the slow axes of the respective diffusion plates 7c differ from each other.

Embodiment 3

Figure 7:
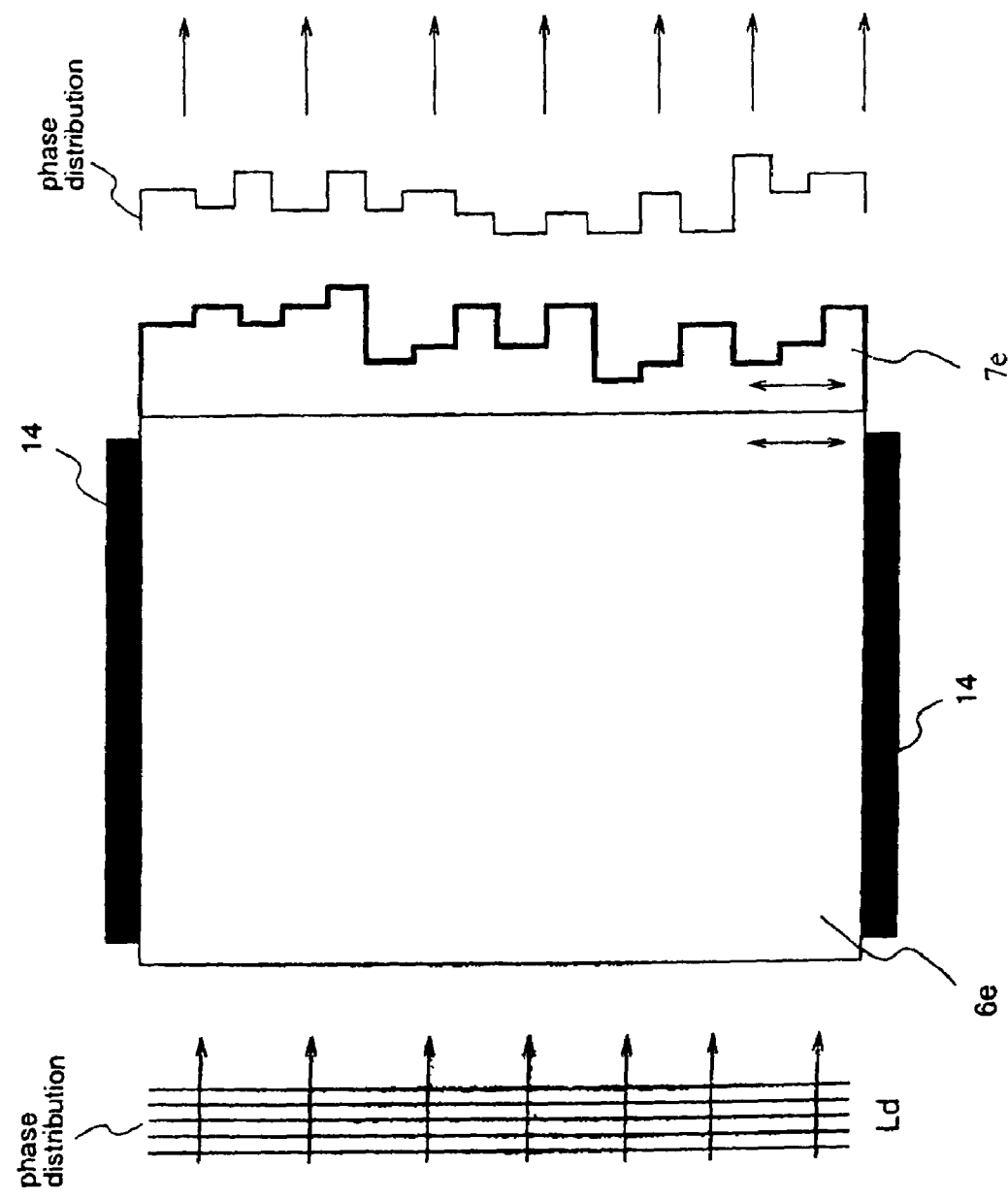
FIG. 7 is a diagram for explaining a two-dimensional image display device according to a third embodiment, illustrating an integrated polarization state modulator and birefringent diffusion plate.

FIG. 7 is a diagram for explaining a two-dimensional image display device according to a third embodiment of the present invention, schematically illustrating a speckle noise removal optical system in the two-dimensional image display device.

In the two-dimensional image display device according to the third embodiment, the polarization state modulator 6 and the birefringent diffusion plate 7e which constitute the speckle noise removal optical system of the second embodiment are integrated. Other constituents of the third embodiment are identical to those of the second embodiment.

The speckle noise removal optical system of the two-dimensional image display device according to the third embodiment is obtained by integrating, on a single LiNbO$_3$ crystal, a polarization state modulator 6e for modulating the polarization state of laser light Ld, and a birefringent diffusion plate 7e for spatially varying the phase of the laser light whose polarization state is modulated.

A specific fabrication method thereof is as follows. A facet of one end of LiNbO$_3$ crystal is partitioned so that plural cell regions are arranged in a reticular pattern, and the crystal is processed so that cell regions Rc of different substrate thicknesses are randomly arranged, similarly as mentioned for the second embodiment, thereby fabricating the birefringent diffusion plate 7e. Further, on a portion of the other end of the LiNbO$_3$ crystal, electrodes 14 are disposed on the ±Z planes of the crystal to fabricate the polarization state modulator 6e.

Next, the function and effect will be described.

In the two-dimensional image display device according to the third embodiment, when linear-polarized coherent laser light Ld enters the polarization state modulator 6e, at least one of the polarization state and the phase of the laser light Ld varies temporally in the polarization state modulator 6e. Then, the laser light from the polarization state modulator 6e passes through the birefringent diffusion plate 7e, whereby, in portions of the laser light corresponding to the respective cell regions, phase delays corresponding to the substrate thicknesses in the respective cell regions occur, resulting in a spatially random phase pattern as shown in FIG. 7.

On the screen, a lot of different speckle patterns occur due to the laser light emitted from the birefringent diffusion plate 7e. When an observer observes a projected image, the observer can observe a two-dimensional image in which these speckle patterns are temporally averaged and thereby speckle noise is reduced.

As described above, in the two-dimensional image display device according to the third embodiment, since the polarization state modulator 6e and the birefringent diffusion plate 7e which constitute the speckle removal optical system are integrated, a compact speckle removal optical system can be realized, leading to reduction in the size of the whole two-dimensional image display device.

Embodiment 4

Figure 8A:
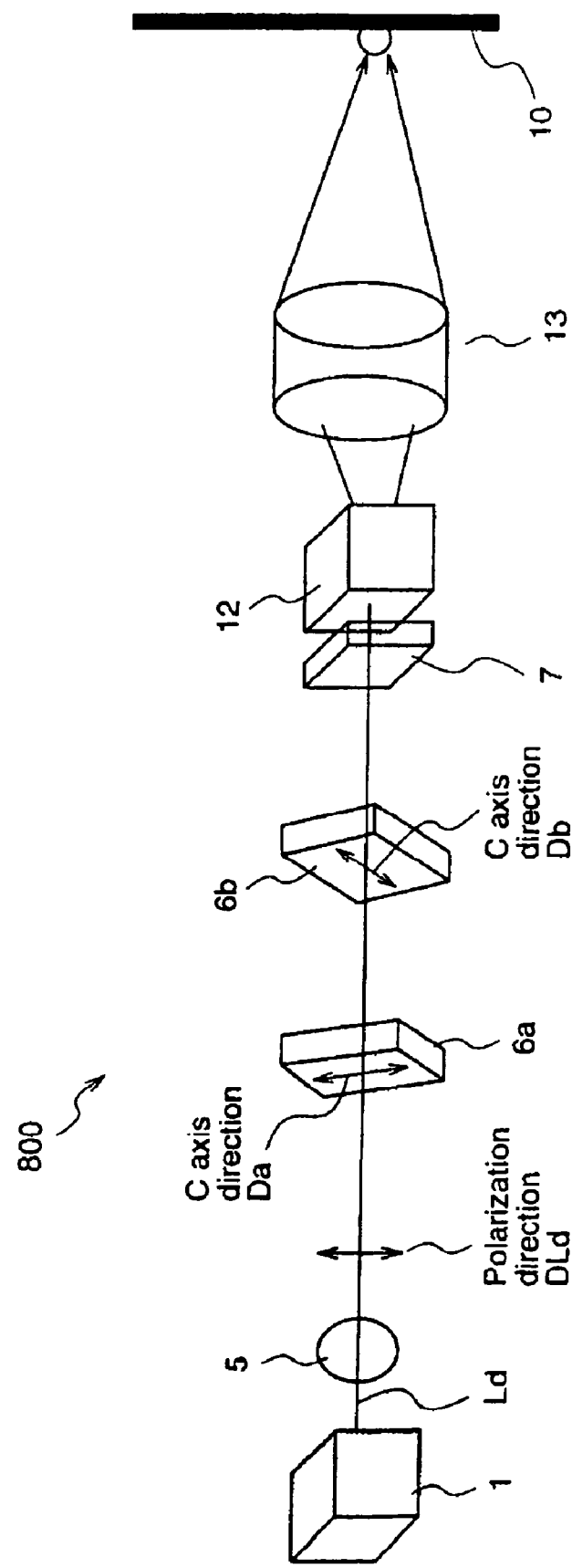
FIG. 8(a) is a diagram for explaining an operation according to a fourth embodiment, conceptually illustrating an optical system for one color of a two-dimensional image display device.
Figure 8B:
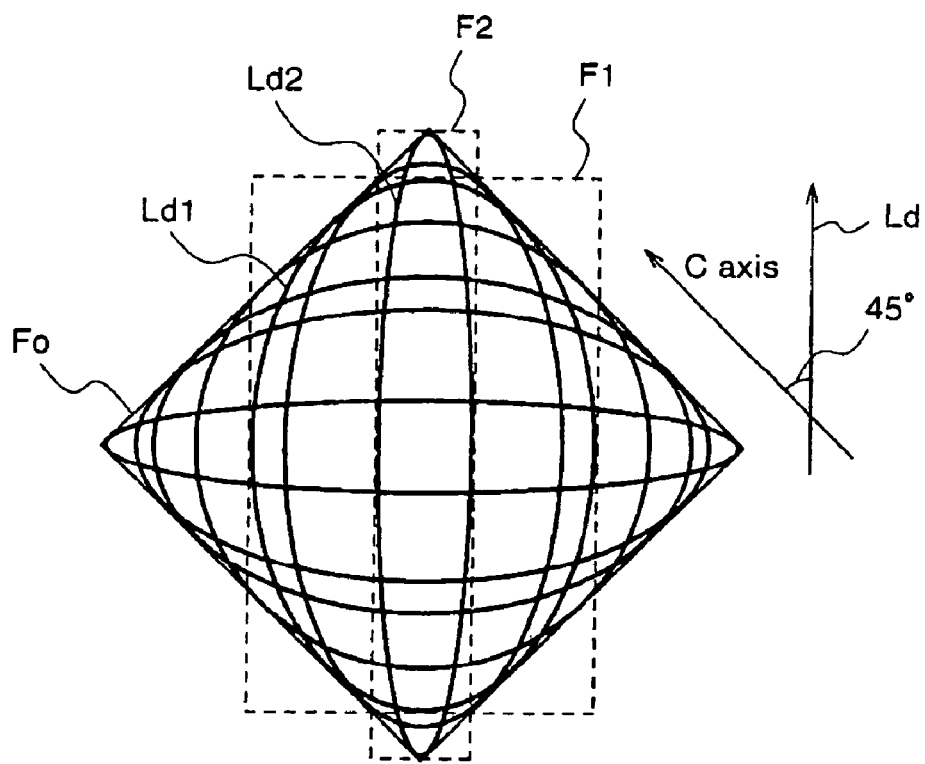
FIG. 8(b) is a diagram for explaining the operation according to the fourth embodiment, schematically illustrating the polarization state of laser light Ld.
Figure 8C:
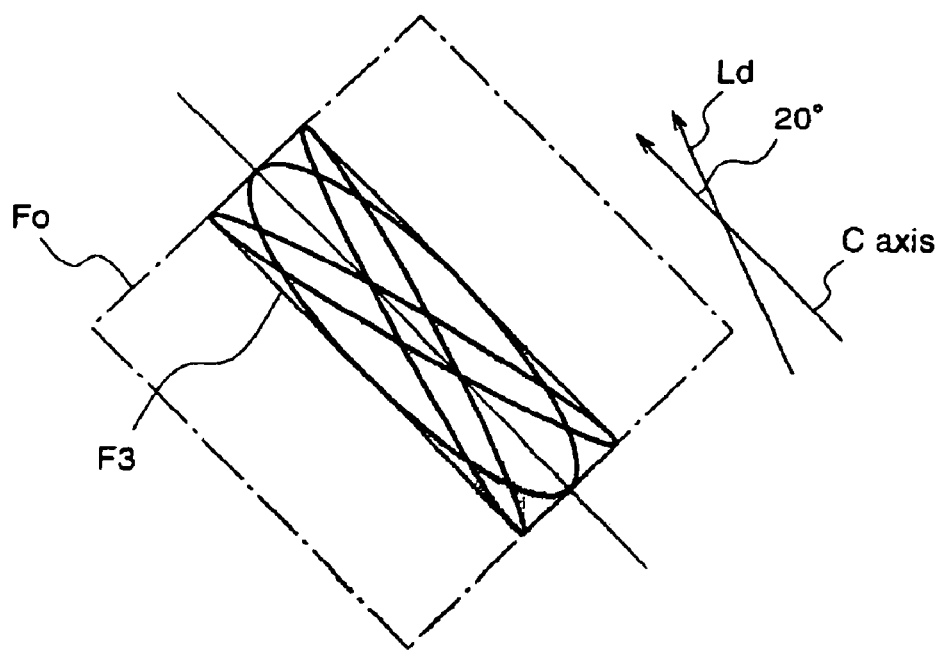
FIG. 8(c) is a diagram for explaining the operation according to the fourth embodiment, schematically illustrating another example of the polarization state of the laser light Ld.

FIGS. 8(a) and 8(b) are diagrams for explaining a two-dimensional image display device according to a fourth embodiment of the present invention. FIG. 8(a) shows a schematic construction of an illumination optical system of the two-dimensional image display device, and FIG. 8(b) is a diagram for explaining the operation of the two-dimensional image display device. In these figures, reference numeral 800 denotes an illumination optical system constituting the two-dimensional image display device of the fourth embodiment, and 6a and 6b denote polarization state modulators. The same reference numerals as those shown in FIG. 2 denote the same constituents as those of the first embodiment.

More specifically, the two-dimensional image display device according to the fourth embodiment is provided with two polarization state modulators 6a and 6b whose C axis directions are at right angles to each other, which are disposed in series along the optical axis of the illumination optical system, instead of the polarization state modulator 6 in the two-dimensional image display device of the first embodiment.

Each of the polarization state modulators 6a and 6b is fabricated by forming electrodes on ±Z planes of a Z-plate LiNbO$_3$, respectively, like the polarization state modulator 6 of the first embodiment. Further, when polarization of laser beam is linear polarization, the polarization state modulator 6a is disposed such that the C axis of the Z-plate LiNbO$_3$ is inclined at a 45 degree angle with respect to the polarization direction. Further, the polarization state modulator 6b is arranged so that the C axis thereof is perpendicular to the C axis of the polarization state modulator 6a.

Next, the function and effect will be described.

FIG. 8(b) schematically illustrates the polarization state of the laser light Ld incident on the polarization state modulator 6a.

When laser light is emitted from the laser source 1, the laser light Ld enters a condenser lens 5 through a multiplexing optical system (not shown), and the laser light condensed by the condenser lens 5 enters the polarization state modulator 6a. As mentioned above, the C axis direction Da of the polarization state modulator 6a is inclined at 45° with respect to the polarization direction DLd of the laser light Ld. Therefore, as shown in FIG. 8(b), the polarization type of the laser light Ld projected on the incident plane of the polarization state modulator 6a can be changed, by electric field control, to linear polarization, or elliptic polarization, or circular polarization, so as to internally contact a square frame F0, and furthermore, the polarization direction can be changed.

For example, the linear-polarized laser light Ld can be changed to elliptic polarized light Ld1 that is inscribed in a rectangle frame F1, or to elliptic polarized light Ld2 that internally contacts a rectangle frame F2 which is vertically longer than the rectangle frame F1, by the polarization state modulator 6a.

Further, the polarization direction or the polarization type of the laser light emitted from the polarization state modulator 6a can be changed by the polarization state modulator 6b such that, for example, the elliptic polarized light Ld1 can be changed so as to internally contact a rectangle frame F1, and the elliptic polarized light Ld2 can be changed so as to internally contact a rectangle frame F2.

When the degree of inclination of the polarization direction DLd of the laser light Ld with respect to the C axis direction Da of the polarization state modulator 6a is smaller than 45°, e.g., when it is 20°, the polarization type of the laser light Ld formed on the incident plane of the polarization state modulator 6a is changed to linear polarization, elliptic polarization, or circular polarization only in such a form that the laser light Ld internally contacts a rectangle frame F3.

Accordingly, the C axis direction Da of the polarization state modulator 6a is inclined at 45° with respect to the polarization direction DLd of the laser light Ld as described above, whereby the polarization type can be arbitrarily changed with by the two polarization state modulators 6a and 6b. Further, as for linear polarization and elliptic polarization, the polarization direction thereof can be changed in all directions of 360°. The change in the polarization state is carried out by electric field control of the two polarization state modulators 6a and 6b, and the respective modulators temporally change the polarization state with different frequencies in order to create an arbitrary polarization state.

When the laser light Ld emitted from the polarization state modulator 6b passes through the birefringent diffusion plate 7, a lot of different speckle patterns occur on the screen 10, and these speckle patterns are temporally averaged and thereby speckle noise is reduced when the observer observes a projected image.

As described above, in the two-dimensional image display device of the fourth embodiment, the two polarization state modulators 6a and 6b are disposed in series along the optical axis of the illumination optical system so that the orientations of the C axes of the respective modulators are different from each other. Therefore, an arbitrary polarization state can be created, and the phase pattern that occurs after the laser light Ld passes the birefringent diffusion plate can be further increased. Thereby, further reduction in the speckle noise that appears on the screen 10 can be achieved.

The speckle noise elimination system according to the present invention is also applicable to a monochromatic laser image projection device. For example, it is also applicable, as a spatial light modulator, to an exposure lighting device used for semiconductor processing, in which a mask pattern image is formed on a semiconductor substrate as a screen, using a photo mask that is obtained by patterning a metal film on a glass substrate.

APPLICABILITY IN INDUSTRY

In a two-dimensional image display device according to the present invention, a spatial phase pattern of laser light Ld is randomly varied by a polarization state modulator and a birefringent diffusion plate which are connected in series to an illumination optical system, thereby removing speckle noise by a simple structure. It is useful in removing speckle noise in a projection type display in which a projection optical system and a screen are separated, or a rear projection type display in which a projection optical system and a transparent type screen are combined.

The invention claimed is:

1. A two-dimensional image display device for displaying an image by projecting coherent light on a projection plane, comprising:
   at least one coherent light source for outputting coherent light;
   a polarization state modulator for modulating at least one of a polarization state and a phase of the coherent light emitted from the coherent light source; and
   a birefringent diffusion plate for spatially varying the phase of the coherent light emitted from the polarization state modulator;
   wherein the coherent light, the phase of which is varied by the polarization state modulator, is projected onto the projection plane.

2. A two-dimensional image display device as defined in claim 1 wherein said birefringent diffusion plate and said projection plane are in an image forming relation.

3. A two-dimensional image display device as defined in claim 1 wherein the birefringent diffusion plate has a coherent light incident plane which is spatially regionally divided, and the respective regions have directions of the optical axes which are randomly set.

4. A two-dimensional image display device as defined in claim 1 wherein the birefringent diffusion plate has a coherent light incident plane which is spatially regionally divided, and random phase delay amounts of the coherent light are generated in the respective regions.

5. A two-dimensional image display device as defined in claim 4 wherein, in said birefringent diffusion plate, the phase delay amount $\Delta\phi$ satisfies $0 \leq \Delta\phi \leq 2\pi$, and the phase delay amount is generated at an approximately uniform rate.

6. A two-dimensional image display device as defined in claim 1 wherein the birefringent diffusion plate has a coherent light incident plane which is spatially regionally divided, and the respective regions have directions of their optical axes which are set randomly set, and generate random phase delay amounts of the coherent light.

7. A two-dimensional image display device as defined in claim 6 wherein, in said birefringent diffusion plate, the phase delay amount $\Delta\phi$ satisfies $0 \leq \Delta\phi \leq 2\pi$, and the phase delay amount is generated at an approximately uniform rate.

8. A two-dimensional image display device as defined in claim 1 wherein two or more pieces of said birefringent diffusion plates are disposed on an optical path from the coherent light source to the projection plane.

9. A two-dimensional image display device as defined in claim 1 wherein said birefringent diffusion plate is formed of a ferroelectric crystal.

10. A two-dimensional image display device as defined in claim 1 wherein said birefringent diffusion plate includes a liquid crystal as a component material.

11. A two-dimensional image display device as defined in claim 1 wherein two pieces of said polarization state modulators are disposed in series on an optical path from the coherent light source to the projection plane so that the directions of optical axes of the polarization state modulators are different from each other.

12. A two-dimensional image display device as defined in claim 11 wherein said two polarization state modulators modulate at least one of the polarization state and the phase of the coherent light emitted from the coherent light source, with different frequencies from each other.

13. A two-dimensional image display device as defined in claim 1 wherein said polarization state modulator and said birefringent diffusion plate are integrally fabricated.

14. A two-dimensional image display device as defined in claim 1 further including a two-dimensional beam scanning system for scanning the coherent light emitted from the coherent light source in a two-dimensional direction so that an image is displayed on the projection plane.

15. A two-dimensional image display device as defined in claim 1 wherein said polarization state modulator modulates at least one of the polarization state and the phase of the coherent light emitted from the coherent light source, with a frequency f that satisfies formula (1) as follows:

$$f \geq X \times Y \times N (\text{Hz}) \qquad 1$$

wherein X is the number of pixels in the horizontal direction of the image displayed on the projection plane, Y is the number of pixels in the vertical direction of the image displayed on the projection plane, and N is the number of pixels displayed per second.

16. A two-dimensional image display device as defined in claim 1 wherein said polarization state modulator is an optical modulator using electro-optical effect.

* * * * *